(12) United States Patent
Riley

(10) Patent No.: US 7,093,146 B2
(45) Date of Patent: Aug. 15, 2006

(54) POWER MANAGEMENT STATE DISTRIBUTION USING AN INTERCONNECT

(75) Inventor: Dwight D. Riley, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 521 days.

(21) Appl. No.: 10/210,424

(22) Filed: Jul. 31, 2002

(65) Prior Publication Data

US 2004/0025063 A1 Feb. 5, 2004

(51) Int. Cl.
*G06F 1/32* (2006.01)

(52) U.S. Cl. ...................... 713/310; 709/213

(58) Field of Classification Search ............... 713/310
See application file for complete search history.

(56) References Cited

U.S. PATENT DOCUMENTS

| | | | | |
|---|---|---|---|---|
| 5,257,283 A | * | 10/1993 | Gilhousen et al. | 455/522 |
| 5,551,066 A | * | 8/1996 | Stillman et al. | 455/69 |
| 5,752,046 A | * | 5/1998 | Oprescu et al. | 713/300 |
| 6,266,731 B1 | | 7/2001 | Riley | |
| 6,557,068 B1 | | 4/2003 | Riley et al. | |
| 6,675,304 B1 | * | 1/2004 | Pole et al. | 713/322 |
| 6,762,934 B1 | * | 7/2004 | Kitchen et al. | 361/685 |

OTHER PUBLICATIONS

PCI Industrial Computer Manufacturers Group, "PCI-ISA Passive Backplane Standard," pp. 1-2 (at least as early as Jul. 26, 2002).
PCI Industrial Computer Manufacturers Group, "Directory of Specifications," Rev. 2.2, pp. 1-11 (Jan. 23, 2002).
Bustronic Corporation, "Next-Generation Backplanes," http://www.nextgenbackplanes.com/swith.html, pp. 1-3 (at least as early as Jul. 26, 2002).
J. Peters, "PICMG 2.16 CompactPCI/Packet Swtiching Backplane Specification," RTC Magazine, Jun. 2001, pp. 92-93.
R. Somes, "CompactPCI: Ready for Multi-computing," RTC Magazine, Jun. 2001, pp. 94, 96, 97.
PCI Industrial Computer Manufacturers Group, "CompactPCI," pp. 1-3 (at least as early as Jul. 26, 2002).
StarGen Inc., "StarFabric," pp. 1-10 (date unknown).
CompactPCI Short Form Specification, Revision 2.1, pp. 1-7 (1997).
Bustronic Corporation, "Next-Generation Backplane," http://www.nextgenbackplanes.com/star.html, pp. 1-3 (at least as early as Jul. 26, 2002).

* cited by examiner

*Primary Examiner*—Lynne H. Browne
*Assistant Examiner*—Anand B. Patel

(57) ABSTRACT

A distributed power management technique allows controlling power states of devices separated from a power management controller, such as a processor, by an interconnect. The power management controller inserts power state information into an interconnect transaction. An interconnect connected device then extracts the power state information and modifies the power state of the device responsive to the power state information. The power state information can be extracted by a processor that then controls the power state of another device responsive to the power state information.

34 Claims, 4 Drawing Sheets

| STATE | BITS |
|---|---|
| D0 | 00 |
| D1 | 01 |
| D2 | 10 |
| D3 | 11 |
| C0 | 00 |
| C1 | 01 |
| C2 | 10 |
| C3 | 11 |
| S0 | 00 |
| S1 | 01 |
| S2 | 10 |
| S3 | 11 |
| G0 | 00 |
| G1 | 01 |
| G2 | 02 |
| G3/S5 | 03 |
| P0 | 0000 |
| P1 | 0001 |
| P2 | 0010 |
| P3 | 0011 |
| P4 | 0100 |
| P5 | 0101 |
| P6 | 0110 |
| P7 | 0111 |
| P8 | 1000 |
| P9 | 1001 |
| P10 | 1010 |
| P11 | 1011 |
| P12 | 1100 |
| P13 | 1101 |
| P14 | 1110 |
| P15 | 1111 |

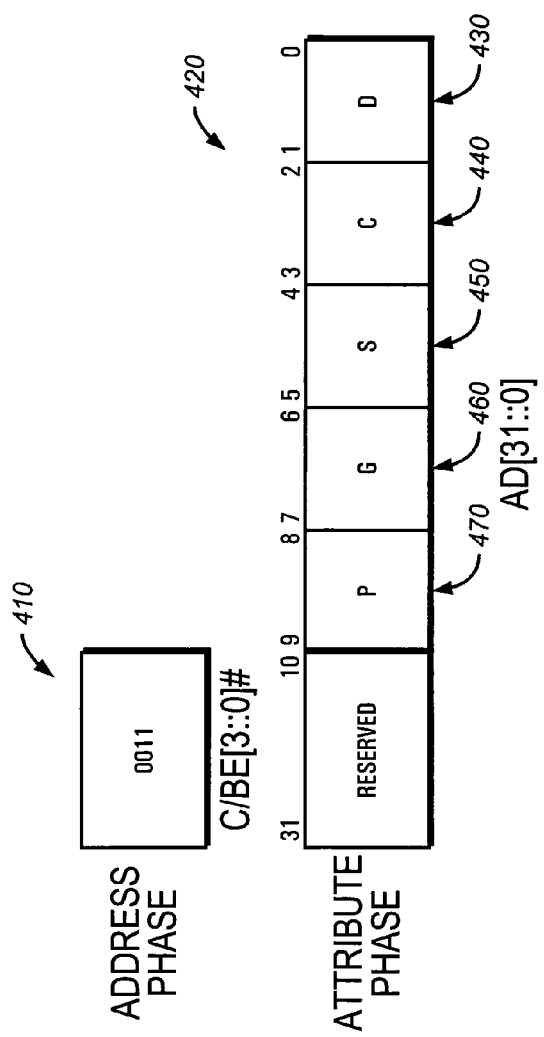

US 7,093,146 B2

POWER MANAGEMENT STATE DISTRIBUTION USING AN INTERCONNECT

CROSS-REFERENCE TO RELATED APPLICATIONS

This application is related to the following commonly owned U.S. patents and patent applications, which are hereby incorporated in their entirety by reference for all purposes:

U.S. Pat. No. 6,266,731, entitled "HIGH SPEED PERIPHERAL INTERCONNECT APPARATUS, METHOD AND SYSTEM," by Dwight Riley and Christopher J. Pettey; and U.S. patent application Ser. No. 09/747,222, entitled "HIGH SPEED PERIPHERAL INTERCONNECT APPARATUS, METHOD AND SYSTEM, " by Dwight Riley and Christopher J. Pettey, filed Dec. 22, 2000, now U.S. Pat. No. 6,557,068.

STATEMENTS REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention generally relates to computer interconnects and in particular to distributed power management of devices connected to interconnect.

2. Description of the Related Art

In a conventional desktop, laptop, or server computer, power management routines can control power usage on devices in the computer enclosure. However, power for devices connected by an interconnect outside of the enclosure has typically not been controllable from a central source.

For devices connected to interconnects, however, the lack of control from a single service has meant that each device desiring power management in a distributed system have typically required their own software to provide independent power management. Today, devices connected to interconnects are typically powered down individually or on an interconnect segment by interconnect segment basis. Such a collection of independent power-managed devices has made keeping devices in a distributed system in a consistent or coherent power state difficult. In addition, the need for independent power management for distributed devices has increased the cost of providing such power management reducing the number of devices that provide such power-saving capabilities. Devices without built-in software capabilities have typically not provided such power management.

As ultra dense servers such as blade servers have become more important, with large numbers of devices connected in distributed systems, the desire for improved power management software capabilities to provide coherent power management has increased.

BRIEF SUMMARY OF THE INVENTION

Briefly, a technique is disclosed for controlling power of distributed devices connected by an interconnect, by transmitting power state information to interconnect connected devices.

In one embodiment, power state information is collected for a first device. An interconnect transaction is generated, containing the power state information, then the transaction is transmitted across the interconnect. The power state information is extracted from the interconnect transaction. A second device's power state is then changed responsive to the power state information extracted from the interconnect transaction.

In one further embodiment, the power state information is ACPI power state information.

In another further embodiment, the interconnect is a PCI interconnect. The PCI interconnect can be a hierarchy of PCI interconnects.

In a further embodiment, generation of the interconnect transaction can generate a PCI message transaction, with the power state information inserted into an attribute phase of the PCI message transaction.

In another further embodiment, the interconnect transaction has an attribute phase, and the power state information is inserted into a reserved portion of the attribute phase. In yet another further embodiment, the interconnect transaction comprises a first attribute phase and a second attribute phase, and the power state information is inserted into the second attribute phase of the interconnect transaction. In another further embodiment, the power state information is extracted from the interconnect transaction by snooping the interconnect.

In another embodiment, the power state of a plurality of devices can be changed responsive to the power state information and the interconnect transaction. The plurality of devices can be coupled to the interconnect or not coupled to the interconnect.

In another further embodiment, the interconnect transaction is generated by generating an interconnect broadcast transaction.

In another further embodiment, the power state information can be extracted from the interconnect transaction by a third device, which controls the power state of the second device.

In another embodiment, a distributed power management system allows a processor connected to an interconnect, the processor having a first processor power state and a second processor power state and an interconnect transaction generator comprising circuitry to generate an interconnect transaction responsive to the processor changing from the first processor power state to the second processor power state.

In a further embodiment, the interconnect transaction contains power state information corresponding to the second processor power state.

In another further embodiment, the system further comprises a first device coupled to the interconnect with circuitry to change the first device from a first device power state to a second device power state responsive to the interconnect transaction. In yet another further embodiment, the system further comprises a first device, coupled to the interconnect, comprising circuitry to change a second device from a first device power state to a second device power state, responsive to the interconnect transaction. The first device can be adapted to snoop the interconnect transaction.

In another embodiment, a processor having a first processor power state and a second processor power state is connected to an interconnect. An interconnect transaction generator coupled to the interconnect can comprise circuitry to generate an interconnect transaction responsive to the processor changing from the first processor power state to the second processor power state, the interconnect transaction comprising a power state information corresponding to the second processor power state. A first device is coupled to a second device that is in turn coupled to the interconnect. The second device comprises circuitry to extract the power state information from the interconnect transaction and circuitry to change the first device from a first device power state to a second device power state responsive to the power state information extracted from the interconnect transaction.

In another embodiment, a distributed power management system comprises an interconnect, a means for generating an interconnect transaction responsive to a primary device changing from a first primary power state to a second primary device power state, the interconnect transaction comprising a power state information corresponding to the second primary device power state. A means for changing a secondary device from a first secondary power state to a second secondary power state is responsive to the power state information.

In one further embodiment, the primary device is a processor. In another further embodiment, the first primary power state and the second primary power state are ACPI-defined power states.

In another further embodiment, the means for changing the secondary device from a first secondary device power state to a second secondary device power state comprises a means for extracting the power state information from the interconnect transaction and a means for modifying the power state of the secondary device independent of software on the secondary device.

In another embodiment, a distributed power management interconnect protocol comprises an interconnect transaction for transmitting power state of a first interconnect connected device to a second interconnect connected device. The interconnect transaction can be constructed according to the PCI-X standard for interconnect transactions.

In a further embodiment, the interconnect transaction is a PCI-X message transaction. In another further embodiment, the interconnect transaction comprises a first attribute phase and a second attribute phase, with the second attribute phase containing the power state information. And yet another further embodiment, the interconnect transaction comprises a first attribute phase, the first attribute phase comprising a lower portion constructed according to the PCI-X standard and an upper portion containing the power state information.

In another embodiment, a distributed power management controller comprises a processor couplable to an interconnect and a memory coupled to the processor adapted to store code for execution by the processor. The code comprising a code to extract power state information from an interconnect transaction and a code to control power states of devices couplable to the processor responsive to the power state information extracted from the interconnect transaction. In a further embodiment, the code to extract power state information comprises code to snoop the interconnect.

BRIEF DESCRIPTION OF THE SEVERAL VIEWS OF THE DRAWINGS

A better understanding of the present invention can be obtained when the following detailed description of the preferred embodiment is considered in conjunction with the following drawings, in which:

FIG. 3a is a block diagram illustrating an exemplary power state information attribute field according to one embodiment;

FIG. 3b is a table illustrating an exemplary mapping power status to bits in the fields of FIG. 3a;

FIG. 4 is a block diagram illustrating an exemplary PCI-X message transaction according to one embodiment;

DETAILED DESCRIPTION OF THE INVENTION

A technique is disclosed herein for enhancing the operation of computer system interconnects that use the extensions to the Peripheral Component Interconnect specification (hereinafter PCI-X interconnects), as well as logic circuits and signal protocols thereof. For illustrative purposes, embodiments are described herein for computer systems using Intel Corporation microprocessor architectures and certain terms and references are specific to such processor platforms. PCI-X and the enhancements described herein, however, are hardware independent, and may be used with any host computer designed for this interconnect standard. As will be appreciated by those skilled in the art of computer systems, the disclosed embodiments can be adapted and applied to any computer platform utilizing the PCI-X standard. Further, although the following is described in terms of PCI-X interconnects, other interconnect architectures and protocols, such as the PCI Express (formerly known as 3GIO) interconnect architecture and protocol being promoted by Intel Corporation, Compaq Computer Corporation, Microsoft Corporation, IBM Corporation, and Dell Computer Corporation, could also be used.

Further, the term "interconnect" as used herein refers generally to connections or pathways between two or more points in a computer system and includes bus implementations, such as conventional PCI busses, as well as non-bus implementations, such as serial interconnects, switches or hubs.

Figure 1:
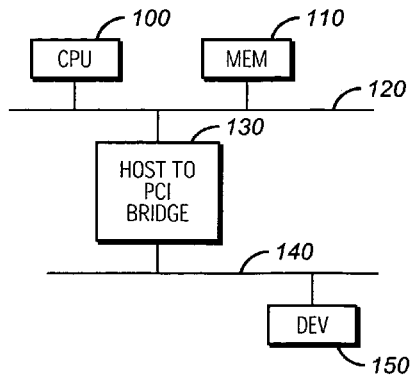
FIG. 1 is a block diagram illustrating a distributed power management system according to one embodiment.

Turning to FIG. 1, a block diagram illustrating a simplified computer system S1 is shown according to one embodiment. A CPU 100 and a memory 170 are connected to a host interconnect 120. A Host-to-PCI bridge 130 couples the host interconnect 120 to a PCI interconnect 140. A device 150 is connected to the PCI interconnect 140. Although shown as a single interconnect segment in FIG. 1 for clarity of the drawing, one skilled in the art will recognize that the PCI interconnect 140 can be a hierarchy of PCI interconnect segments, connected by PCI-to-PCI bridges. Other conventional elements of the computer system S1 are omitted for clarity of the drawing.

As shown in FIG. 1, the CPU 100 executes an operating system (not shown) capable of power management. One standard for power management is the Advanced Configuration and Power Interface (ACPI) Specification 2.0a, a copy of which is incorporated herein in its entirety by reference. Although the ACPI specification provides for defining power management for devices connected to the root PCI interconnect of the computer system, which is typically on the motherboard of the computer system S1, the ACPI specification does not provide for power management of devices on other interconnect segments in the PCI interconnect hierarchy.

In a typical ACPI compliant computer, execution of ACPI routines in the operating system are triggered by predefined events, such a state change of a power switch, in incoming telephone call, or expiration of a timer. Typically a special interrupt known as a System Management Interrupt (SMI) is generated upon an ACPI event, then the appropriate operating system routine, which can be a device driver, is executed to affect the desired power state change. Power state changes can be effected by switches or other techniques such as reducing or increasing clock rates for clocks used by the device whose power state is to be changed.

For clarity of the drawing, the PCI interconnect hierarchy is shown as a single PCI interconnect segment 140. ACPI routines executing on the CPU 100 detect a change in power state and create a PCI-X transaction to inform the device 150 of the change, allowing the device 150 to change power state accordingly. The power state change may increase or decrease the power usage.

The PCI-X transaction is routed through the PCI interconnect hierarchy in the conventional manner as necessary to reach the device 150. In one embodiment, the PCI-X transaction is a conventional PCI-X transaction, except that it stores the power state information in a previously reserved portion of the attribute phase, such as the AD[63::32] portion of the AD lines. An exemplary arrangement for the power state information is shown in FIG. 3a.

Figures 3A, 3B:
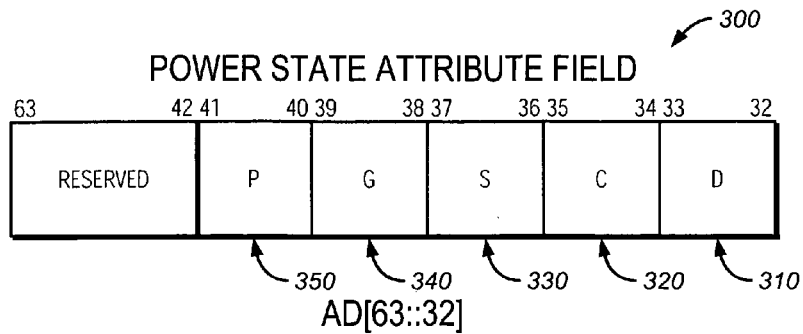

As shown in FIG. 3a, the AD[63::32] portion of the attribute phase contains five fields, containing ACPI power state information. Field 310 is a two-bit field containing device power state information, allowing the ACPI routines on the CPU 110 to directly specify the desired device power state. Field 320 is a two-bit field containing processor power state information. Field 330 is a two-bit field containing sleeping state information. Field 340 is a two-bit field containing global power state information. Field 350 is a four-bit field containing device and processor performance state information. FIG. 3b is a table illustrating an exemplary mapping between the bits of fields 310–350 to their corresponding ACPI power state. As noted in the ACPI specification, the device 150 and the CPU 110 are not required to support all of the ACPI defined power states shown in FIG. 3b. Additionally, the illustrated mapping of bits to state, as well as the number, contents, and arrangement of the power state information drawn in FIGS. 3a and 3b are exemplary and illustrative only, and the other bit mappings, as well as number, content, and arrangement of fields can be used. For example, instead of a two-bit or four-bit field, a 2-byte field can be used for each of fields 310–350, storing the character form of the power states, such as global state "G0." Likewise, when extracting the power state information from the PCI-X transaction, any or all of the attribute data can be extracted.

As shown in FIG. 3a, the power state information is stored in an AD[63::32] portion of the standard PCI-X attribute phase of a conventional PCI-X transaction. In another embodiment, a new PCI-X message transaction can be used, specifying the power state information in a conventional attribute phase AD [31::0] portion of the transaction. Use of a message-type transaction can be used to broadcast the power state information to the entire PCI interconnect hierarchy, allowing multiple devices on multiple interconnect segments to modify their power state accordingly. Alternatively, in yet another embodiment, a second attribute or extended phase of a PCI-X transaction can be defined and used for holding the ACPI power state information. An attribute field similar to FIG. 3a can be used in each of these alternative embodiments.

A typical PCI-X transaction has an attribute phase following an address/command phase. Software generating PCI-X transactions will place attribute data, which can differ depending on the type of PCI-X transaction, on the AD and C/BE# lines of the PCI-X interconnect during the clock cycle following the address phase, and prior to any data phases for the transaction. The PCI-X specification currently provides for a single attribute phase, and defines a set of transaction types. Although the PCI-X specification provides for 64-bit interconnects, the upper 64 bits of the AD lines of the attribute phase typically referred to as AD[63::32] are currently reserved and driven high, as are the upper four bits of the 8-bit C/BE# lines, referred to as C/BE [7::4]#.

Special Cycle PCI-X transactions provide a simple broadcast message mechanism. A set of conventional message types are defined in the PCI 2.2 specification, encoded in the AD[15::0] lines during the data phase of a Special Cycle message. Message types 0003h-FFFFh are currently reserved and one of the reserved message types could be used to indicate a power management transaction.

Turning to FIG. 4, an exemplary PCI-X message transaction for broadcasting power state information is illustrated. During the address phase of the transaction, the C/BE[3::0]# lines are driven with the bits 0011 (often designated as 0003h) to indicate the type of message as shown in field 410. As with conventional PCI-X message transactions, the AD[31::0] lines are not an address and are ignored, thus are not shown in FIG. 4. Then in the attribute phase, AD[31::0] lines 420 are driven with the power state information. Fields 430–470 correspond to fields 310–350 of FIG. 3a.

One skilled in the art will recognize that the message type value of field 410 is exemplary and illustrative only and other values can be used. Further, as with FIG. 3a, fields 430–470 are exemplary and illustrative only and other fields and arrangement of fields can be used.

Upon claiming a PCI-X transaction, a PCI-X device extracts the attribute information from the AD and C/BE# lines, depending on the transaction type previously determined by the address phase of the transaction.

One skilled in the art will recognize that although power states are referenced above in terms of the ACPI specification, other power management techniques and power states can be used.

Figure 2A:
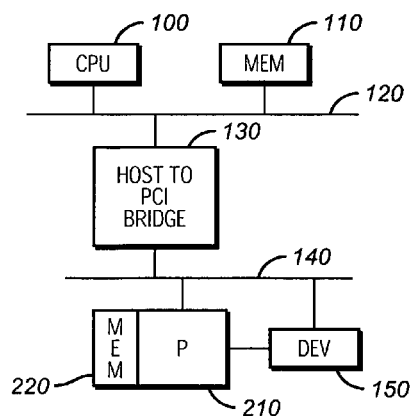
FIG. 2a is a block diagram illustrating a distributed power management system according to a second embodiment.
Figure 2B:
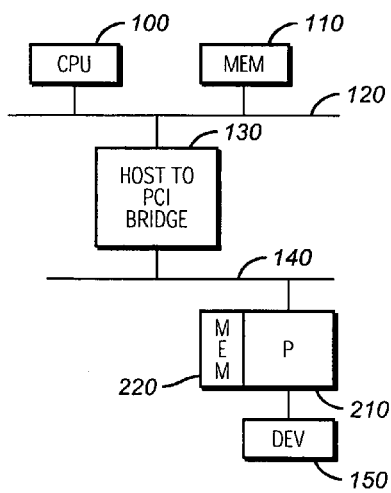
FIG. 2b is a block diagram illustrating a distributed power management system according to a third embodiment.

FIGS. 2a and 2b illustrates alternate embodiments, in which existing PCI devices 150 without support for power state management can be managed by a separate power management processor. In FIG. 2a, a processor 210, which may have an associated memory 220 for storing firmware or software, coupled to device 150, both of which are connected to the PCI interconnect, extracts the power state information from the PCI-X transaction. Neither the CPU 110 nor the device 150 need be aware of the presence of processor 210. The processor 210 can snoop the PCI interconnect segment 140 to extract the power state information, rather than claiming the transaction.

Figure 5A:
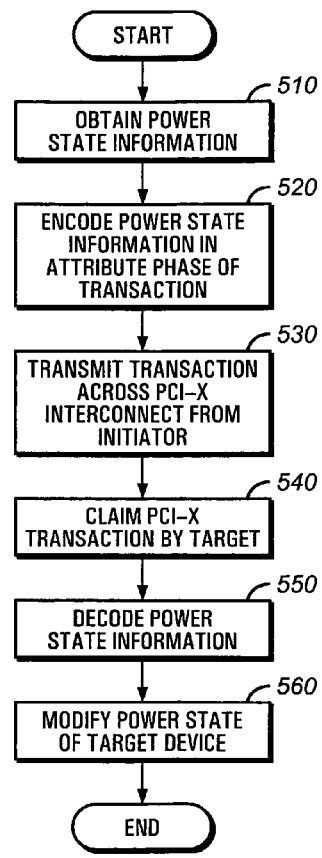
FIG. 5a is a flowchart illustrating steps for transmitting power-state information in an attribute phase of PCI-X transaction.

FIG. 5a is a flowchart illustrating exemplary steps for transmitting power state information in an attribute phase of a PCI-X transaction. In step 510, an initiator obtains power state information, typically from an ACPI operating system routine. The power state information is then encoded in step 520 into a PCI-X transaction in the attribute phase of the transaction, using an encoding such as described above. As described above, the power state information can be encoded in a reserved portion of the standard PCI-X attribute phase or in a second or extended attribute phase.

Then in step 530, the transaction is transmitted across the PCI-X interconnect using conventional PCI-X signaling techniques. In step 540, the transaction is claimed by the target device, again using conventional PCI-X signaling techniques.

The target device then decodes the power state information from the attribute phase in step 550. Finally, the target device can modify its power state to correspond with the power state information decoded from the transaction. Note that the target device can choose to ignore the power state information, if desired.

Figure 5B:
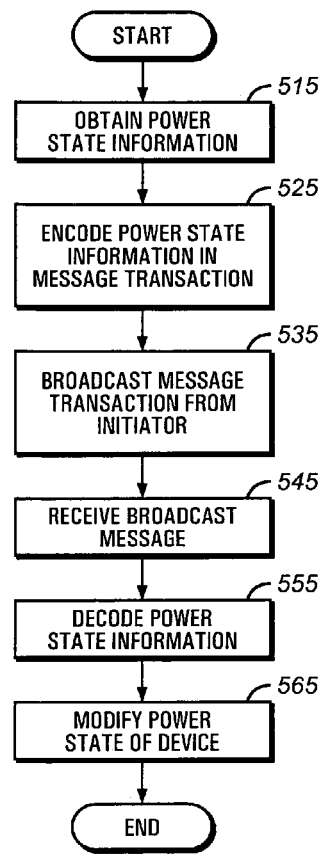
FIG. 5b is a flowchart illustrating steps for broadcasting power state information using a message transaction.

In FIG. 5b, a flowchart illustrates corresponding steps in an embodiment using message transactions. In step 515, the power state information is obtained, as in step 510 of FIG. 5a. In step 525, the power state information is encoded into a message transaction as described above. Then in step 535, the message transaction is placed on the interconnect, broadcasting the message. Message transactions are not claimed by target devices. In step 545, any device can receive the message transaction without claiming it. Then in step 555, the power state information of the message transaction is decoded. Finally, in step 565, corresponding to step 560 of FIG. 5a, receiving devices can modify their power state information based on the decoded power state information.

FIG. 2a illustrates an embodiment where both processor 210 and device 150 are connected to the PCI interconnect 140. FIG. 2b illustrates an embodiment in which device 220, which does not need to be a PCI device and is not connected to the same PCI interconnect segment 140, can be managed by the processor 210, whether claiming a power-state transaction, processing a message-type broadcast transaction, or swooping the PCI interconnect segment 140. Once processor 210 extracts the power state information from the PCI-X transaction, it can control the power to device 150 or device 220, as shown in FIGS. 2a–2b. Although the optional memory 220 is shown directly connected to processor 210 in FIGS. 2a–2b for convenience of the drawing, the location of the optional memory 220 can be changed.

The disclosed technique can provide the ability for interconnect connected devices to track the power state of processors, processor boards, processor subsystems, or other server resources automatically, without the need for software support in the interconnect connected devices. Further, by use of a separate processor as shown in FIGS. 2a–2b, unmodified devices, whether or not interconnect connected, can be managed by a remote power management controller. Although described above as a processor, one skilled in the art will recognize that such a remote power management controller can be implemented in numerous ways, some of which may not include a processor.

The foregoing disclosure and description of the invention are illustrative and explanatory thereof, but to the extent foreseeable, the spirit and scope of the invention are defined by the appended claims.

I claim:

1. A method of distributed power management, comprising the steps of:
    collecting a power state information for a first device coupled to an interconnect;
    generating an interconnect transaction for sending the power state information;
    transmitting the interconnect transaction across the interconnect;
    extracting the power state information from the interconnect transaction; and
    changing a power state of a second device responsive to the power state information,
    wherein the power state information is ACPI power state information.

2. The method of claim 1, wherein the interconnect is a PCI interconnect.

3. The method of claim 2, wherein the PCI interconnect is a hierarchy of PCI interconnects.

4. The method of claim 1, the step of extracting comprising the step of:
    snooping the interconnect.

5. The method of claim 1, the step of changing the power state of the second device comprising:
    changing the power state of a plurality of devices.

6. The method of claim 5, wherein the plurality of devices are coupled to the interconnect.

7. The method of claim 1,
    the step of extracting the power state information comprising the step of:
        extracting the power state information by a third device; and
    the step of changing the power state of a second device comprising the step of:
        controlling the power state of the second device by the third device.

8. A method of distributed power management, comprising the steps of:
    collecting a power state information for a first device coupled to an interconnect;
    generating an interconnect transaction for sending the power state information;
    transmitting the interconnect transaction across the interconnect;
    extracting the power state information from the interconnect transaction; and
    changing a power state of a second device responsive to the power state information,
    wherein the interconnect is a PCI interconnect, the step of generating an interconnect transaction comprising the steps of:
        generating a PCI message transaction; and
        inserting the power state information into an attribute phase of the PCI message transaction.

9. A method of distributed power management, comprising the steps of:
    collecting a power state information for a first device coupled to an interconnect;
    generating an interconnect transaction for sending the power state information;
    transmitting the interconnect transaction across the interconnect;
    extracting the power state information from the interconnect transaction; and
    changing a power state of a second device responsive to the power state information,
    wherein the interconnect is a PCI interconnect, the interconnect transaction comprising:
        an attribute phase;
    the step of generating an interconnect transaction comprising:

inserting the power state information into a reserved portion of the attribute phase of the interconnect transaction.

10. A method of distributed power management, comprising the steps of:
collecting a power state information for a first device coupled to an interconnect;
generating an interconnect transaction for sending the power state information;
transmitting the interconnect transaction across the interconnect;
extracting the power state information from the interconnect transaction; and
changing a power state of a second device responsive to the power state information,
wherein the interconnect is a PCI interconnect, the interconnect transaction comprising:
a first attribute phase; and
a second attribute phase;
the step of generating an interconnect transaction comprising:
inserting the power state information into the second attribute phase of the interconnect transaction.

11. A method of distributed power management, comprising the steps of:
collecting a power state information for a first device coupled to an interconnect;
generating an interconnect transaction for sending the power state information;
transmitting the interconnect transaction across the interconnect;
extracting the power state information from the interconnect transaction; and
changing a power state of a second device responsive to the power state information,
the step of changing the power state of the second device comprising:
changing the power state of a plurality of devices,
wherein the plurality of devices are not coupled to the interconnect.

12. A method of distributed power management, comprising the steps of:
collecting a power state information for a first device coupled to an interconnect;
generating an interconnect transaction for sending the power state information;
transmitting the interconnect transaction across the interconnect;
extracting the power state information from the interconnect transaction; and
changing a power state of a second device responsive to the power state information,
the step of generating an interconnect transaction comprising the step of:
generating an interconnect broadcast transaction.

13. A method of distributed power management, comprising the steps of:
transmitting a power state information of a first device across an interconnect in an interconnect transaction;
extracting, by a second device, the power state information from the interconnect transaction; and
modifying a power state of the second device responsive to the extracted power state information.

14. The method of claim 13, the modifying step comprising the step of:
changing the power state of the second device independent of software on the second device.

15. A distributed power management system, comprising:
a Peripheral Component Interconnect (PCI) interconnect;
a processor coupled to the PCI interconnect, the processor having a first Advanced Configuration and Power Interface (ACPI) processor power state and a second ACPI processor power state, comprising:
an interconnect transaction generator, coupled to the PCI interconnect, comprising:
circuitry to generate a PCI interconnect transaction responsive to the processor changing from the first ACPI processor power state to the second ACPI processor power state.

16. The system of claim 15, further comprising:
a first device, coupled to the PCI interconnect, comprising:
circuitry to change the first device from a first device power state to a second device power state, responsive to the PCI interconnect transaction.

17. The system of claim 15, further comprising:
a first device, coupled to the PCI interconnect, comprising:
circuitry to change a second device from a first device power state to a second device power state, responsive to the PCI interconnect transaction.

18. The system of claim 17, wherein the first device is adapted to snoop the PCI interconnect transaction.

19. The system of claim 15, wherein the processor is located on a blade for a blade server.

20. The system of claim 15, wherein the PCI interconnect transaction contains power state information corresponding to the second ACPI processor power state.

21. A distributed power management system, comprising:
an interconnect;
a processor coupled to the interconnect, the processor having a first processor power state and a second processor power state, comprising:
an interconnect transaction generator, coupled to the interconnect, comprising:
circuitry to generate an interconnect transaction responsive to the processor changing from the first processor power state to the second processor power state,
wherein the interconnect transaction contains power state information corresponding to the second processor power state.

22. A distributed power management system, comprising:
an interconnect;
means for generating an interconnect transaction responsive to a primary device changing from a first primary device power state to a second primary device power state, the interconnect transaction comprising:
a power state information corresponding to the second primary device power state; and
means for changing a secondary device from a first secondary device power state to a second secondary device power state, responsive to the power state information,
wherein first primary power state and the second primary power state are ACPI-defined power states.

23. The distributed power management system of claim 22, wherein the primary device is a processor.

24. The distributed power management system of claim 22, wherein the secondary device is located on a blade for a blade server.

25. The distributed power management system of claim 22, the means for changing comprising:

means for extracting the power state information from the interconnect transaction; and means for modifying a power state of the secondary device independent of software on the secondary device.

26. A distributed power management interconnect protocol, comprising:
an interconnect transaction for transmitting power state information of a first interconnect connected device to a second interconnect connected device,
wherein the interconnect transaction is constructed according to the PCI-X standard for interconnect transactions,
the interconnect transaction comprising:
a first attribute phase; and
a second attribute phase, the second attribute phase containing the power state information.

27. A distributed power management interconnect protocol, comprising:
an interconnect transaction for transmitting power state information of a first interconnect connected device to a second interconnect connected device,
wherein the interconnect transaction is constructed according to the PCI-X standard for interconnect transactions,
the interconnect transaction comprising:
an attribute phase, the attribute phase comprising:
a first portion, the first portion constructed according to the PCI-X standard; and
a second portion containing the power state information.

28. The interconnect protocol of claim 27, the interconnect transaction comprising:
a PCI-X message transaction.

29. A system comprising:
a Peripheral Component Interconnect (PCI) bus; and
a first device coupled to the PCI bus, the first device to receive a PCI message transaction containing power state information over the PCI bus,
the PCI message transaction comprising at least one of (1) a PCI message transaction having an attribute phase containing the power state information, and (2) a broadcast transaction containing the power state information,
the first device to extract the power state information from the message transaction.

30. The system of claim 29, the first device to modify a power state of the first device based on the extracted power state information.

31. The system of claim 29, further comprising a second device, the first device to modify a power state of the second device based on the extracted power state information.

32. The system of claim 29, wherein the power state information comprises ACPI power state information.

33. The system of claim 32, further comprising an ACPI routine to provide the power state information.

34. The system of claim 33, further comprising an initiator to provide the power state information from the ACPI routine into the message transaction.

* * * * *